April 18, 1950     W. D. MITCHELL     2,504,862
CHURN AND ADAPTER THEREFOR
Filed Aug. 10, 1949
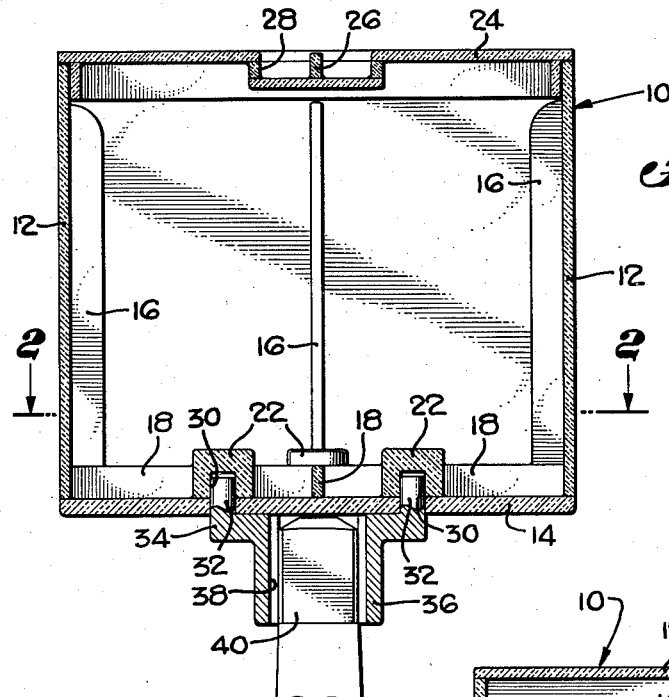
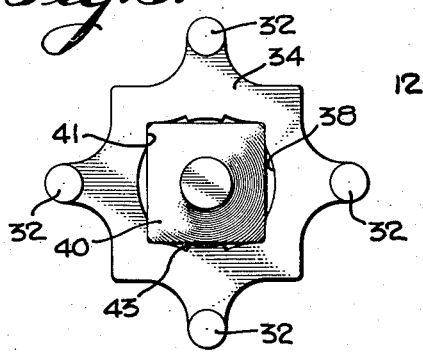
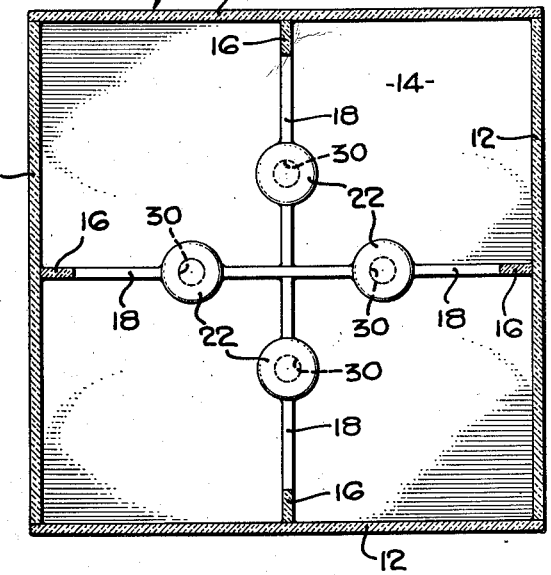
INVENTOR,
WILEY D. MITCHELL.
ATTORNEY Patented Apr. 18, 1950

2,504,862

UNITED STATES PATENT OFFICE 2,504,862

CHURN AND ADAPTER THEREFOR

Wiley D. Mitchell, Highgrove, Calif.

Application August 10, 1949, Serial No. 109,528

1 Claim. (Cl. 259—75)

My invention relates to churns for churning butter, making ice cream and similar purposes and my particular invention is a churn and an adapter to enable the churn to be quickly, inexpensively and readily connected to and disconnected from the driving nut of an ordinary washing machine agitator.

My churn can be made of plastic clear material so that the condition or status of the material being churned can be seen at all times, although it is not necessary to make it of clear material and it will work with opaque walls, as, for instance, if it is made of wood.

It is an object of my invention to provide a churn which has a smooth, flat bottom and top and thus it can be quickly placed in an ordinary refrigerator after the churn is removed from the adapter.

It is another object of my invention to provide a churn which can be made in a standard size and then adapted to fit any washing machine agitator drive nut by the provision of my novel adapter. The adapter costs only a fraction of the cost of the churn and thus it saves considerable of the manufacturing cost of churns to fit all types of washing machine agitator drive nuts.

It is an object of my invention to provide a churn which can be used to wash delicate materials, such as silk stockings and ladies' underwear, due to the gentle action of the churn and the absence of rough surfaces on the inside of the churn.

Other objects and advantages of my invention will be apparent from the following description and claim, the novelty consisting in the features of construction, combination of parts, the unique relations of the members and the relative proportioning, disposition and operation thereof, all as is more completely outlined herein and as is particularly pointed out in the appended claim.

In the accompanying drawings, forming a part of this present specification,

Figure 1 is a vertical sectional view of my churn showing the preferred embodiment in its completely assembled position.

Figure 2 is a horizontal sectional view along the lines 2—2 of Figure 1.

Figure 3 is a plan view of my adapter engaging a square drive nut.

Figure 4 is a plan view of my adapter engaging a hex drive nut.

Referring to the drawings, I will describe the parts and construction and mode of operation of my preferred embodiment of my churn.

The churn 10 is preferably made in the form of a square and I have found that the best size is to have the sides eight-by-eight (8" x 8") inches and the height of the walls of the churn seven (7") inches although any reasonable size churn above a size of six-by-six-by-six (6" x 6" x 6") inches is satisfactory. Although the churn can be made of any desirable shape, I prefer to square churn having four walls 12 and a bottom 14. I prefer to make the walls and bottom of clear plastic material so that it is possible to see what is happening to the matter inside of the churn during operations.

In my preferred embodiment I provide four vertical ribs 16 preferably located in the center of each wall 12 and four horizontal ribs 18 preferably located in the center of the bottom 14 and connecting the vertical ribs 16. In this manner, the ribs being substantially the same size, I provide four inwardly extending ribs or vanes on the vertical walls and four similar sized ribs or vanes on the bottom, thus dividing my churn into four substantially equal sections.

These ribs or vanes serve to agitate the material being churned and to break up the even flow of this material so as to make it agitate more vigorously. They are preferably a half inch deep though they may be smaller or larger.

I provide raised lugs 22, preferably four in number, which are integrally attached to the bottom 14. My preferred position of these lugs is to make each one of them astride of or interrupting the line of one of the horizontal ribs 18. These raised lugs 22 must have a fluid tight mounting on the bottom 14, or be cast integrally with the bottom 14, in order to prevent any liquid in the churn from escaping.

A snug fitting lid 24 is provided on the top of my churn 10 and a depressed handle 26 fitting in a well 28 makes the top of the lid 24 flush for easy storage, packing and shipment. I always prefer to have the lid on whenever any churning operation is being performed.

Turning to the mechanical operation of my churn I provide a hollow center 30 in each of my raised lugs 22. This hollow center 30 is adapted to receive and engage a leg 32 of my adapter 34. Thus a simple and sound mechanical connection between my adapter 34 and my churn 10 is provided. It is very easy to insert the leg 32 into the hollow opening 30 in my raised lug 22 and thus the churn 10 can be connected to my adapter by merely inserting the legs 32 into the openings 30 in my lugs 22.

When it is desired to disconnect my churn from my adapter, it is necessary only to lift the churn upwardly off of the legs 32 of my adapter 34.

My churn is preferably made of sufficiently strong material that the lugs 22 can take the torsional strain imparted by the legs 32 of my adapter 34.

My adapter 34 has a downwardly extending portion 36 and a bore 38 to engage a driving nut. This driving nut may be square like square driving nut 40 in which case it is engaged by square opening 41 in adapter 34 as is seen in Figures 3 and 4.

On the other hand the driving nut may be of any desired shape such as hex driving nut 42 which is engaged by hex opening 43 in adapter 34.

It is obvious that by cutting additional grooves and enlargements of the bore 38 in adapter 34 it will be possible to accommodate an unlimited number of different size driving nuts. In this way the driving nut that accompanies every type of washing machine on the market can be accommodated by one of my adapters 34.

It is conceivable that it might require several different types of adapters 34 to fit all of the drive nuts on the market, but certainly a large number of different sized and shaped drive nuts can be accommodated by each adapter.

Obviously the adapter, which is preferably made of aluminum or some alloy material, is quite inexpensive and costs a small fraction of the cost of the churn 10.

Thus, by providing one or more adapters 34 to fit all of the various types of churns, the cost of manufacture of a complete unit consisting of a churn and an adapter is materially reduced.

By making the lugs 22 integral with the ribs 18, or by attaching the lugs 22, the ribs 18 and the bottom 14 integrally together, greater strength is given to my construction to take the twist or torsional action given by my adapter 34.

The driving nuts 40 or 42, as the case may be, are attached by ordinary screw threaded connections or other means to the agitator 44 of an ordinary washing machine which furnishes the power to actuate my churn 10.

Turning to the mode of operation of my churn, it is only necessary to slip an adapter 34 over the driving nut 40 or 42 of a washing machine agitator 44 and drop my churn onto the upturned legs 32 of my adapter 34 in such a manner that the legs enter into the hollow openings 30 in my raised lugs 22 in order to connect my churn 10 to the agitator 44, and then my churn is ready for use.

If it is desired to churn butter, it is only necessary to put the cream in the churn 10, preferably filling it half full of cream, then turn on the washing machine so that the agitator 44 starts moving, and then leave it until the cream is churned into butter.

The bottom 14 and the lid 24 are flat so that the churn will slide into the ice box and can be used as an ordinary dish for storing butter or other food.

When it is desired to make ice cream with my churn 10, I first pack the churn about half full with ice, sprinkling rock salt on it, and then deposit one or more containers on top of this bed of ice, the containers being filled with the ingredients for making the desired kind of ice cream. Then the space above the container is filled with cracked ice and rock salt and the lid 24 is placed on top, closing the churn 10.

When this has been accomplished it is necessary only to set the churn 10 on top of the upturned legs 32 of my adapter 34 and turn on the washing machine in order to make ice cream.

It ordinarily takes about three hours to make ice cream in a refrigerator mold, whereas with my churn, ice cream can be made in less than half an hour from a standing start.

When it is desired to wash delicate silk stockings or ladies' underwear, or other articles, I put warm soapy water in the churn and place the articles in it. Then the lid 25 is put in place, the churn 10 is placed on the upturned legs 32 in the manner described above, and the washing machine is started.

Also my churn can be used as a home dry cleaner by placing the dry cleaning fluid and the clothes in the churn and operating it in the manner above described for washing delicate garments.

It will give a gentle rubbing action to the clothing which will be washed clean without any damage as there are no rough corners on the inside of my churn since it is perfectly made of plastic material with no sharp edges, but all rounded surfaces.

An advantage of my churn is that it always makes butter uniformly and in substantially the same amount of time. At sixty-three (63°) degrees temperature it will produce butter in about twelve minutes. On the other hand, in using a hand churn to make butter, sometimes the operator will churn for hours and the butter will not come due to the irregular hand action.

With my churn the mechanical action is certain and with the rib construction and alternating movement the butter always comes in approximately the same time.

Another advantage of my churn and adapter is that there are no parts that move against one another to wear and there is nothing to wear out.

My churn will be most helpful in rural communities where they generally have washing machines with agitators suitable for operating my churn and where, at present, they usually perform the various operations accomplished by my churn by hand.

My churn will be quite inexpensive to make, due to the simplicity of its ingenious and novel construction which makes it possible to provide an inexpensive and economical churn.

Other advantages will be apparent and it is understood that the form of my invention herein shown and described is my preferred embodiment and that various changes in the shape, size and arrangement of parts may be resorted to without departing from the spirit of my invention, or the scope of the appended claim.

I claim:

A churn attachment for a washing machine comprising a receptacle having a flat bottom and side walls, a plurality of raised lugs on the upper surface of said bottom, said lugs having recesses therein which extend through said bottom, and an adapter having a flat upper supporting surface for engaging the flat bottom of said receptacle, a plurality of legs having substantially equal lateral dimensions on said adapter extending upwardly from adjacent the periphery of said flat upper supporting surface in positions to enter said recesses to form a driving connection between said receptacle and said adapter, said adapter having a downwardly extending skirt portion provided with a central vertical bore having inwardly facing shoulders therein for receiving and forming a driving engagement with the driving nut of the agitator shaft of a washing machine.

WILEY D. MITCHELL.

REFERENCES CITED

The following references are of record in the file of this patent:

UNITED STATES PATENTS

| Number | Name | Date |
|---|---|---|
| 33,146 | Harsha | Aug. 27, 1861 |
| 906,090 | Appleman | Dec. 8, 1908 |
| 1,754,951 | Hollier | Apr. 15, 1930 |
| 1,805,952 | Morgan et al. | May 19, 1931 |
| 2,248,203 | Shipley | July 8, 1941 |